Sept. 25, 1934.   S. J. HARBAN ET AL   1,974,650
DISPENSING CONTAINER
Original Filed Nov. 24, 1930
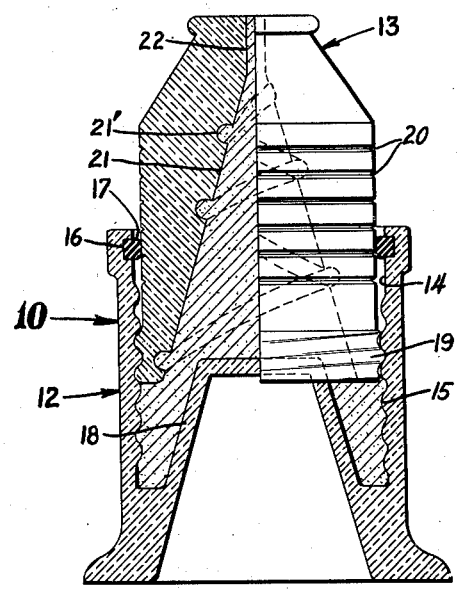
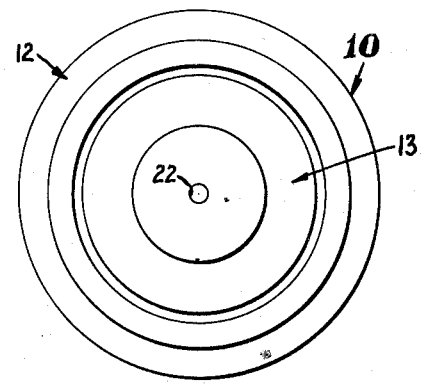
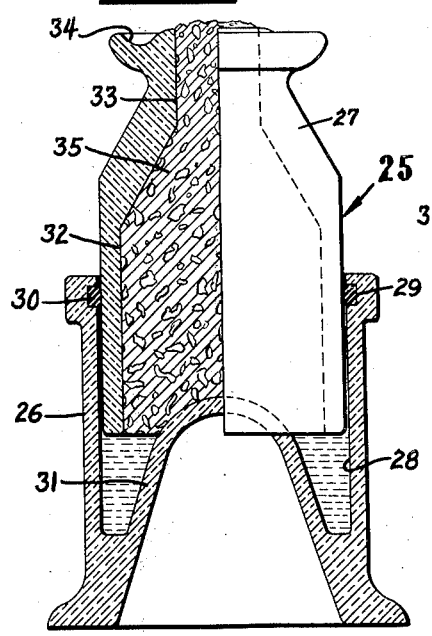
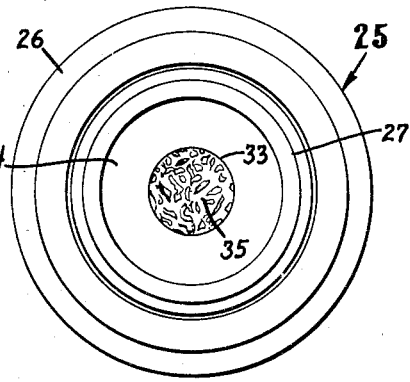
INVENTORS.
S.J. HARBAN.
D.A. HOLCOMB.
BY
ATTORNEY.

Patented Sept. 25, 1934

1,974,650

UNITED STATES PATENT OFFICE 1,974,650

DISPENSING CONTAINER

Steven J. Harban and Dock A. Holcomb, Riverside, Calif.; said Harban assignor to A. J. Wampler, San Bernardino, Calif.

Application November 24, 1930, Serial No. 497,713
Renewed March 3, 1934

2 Claims. (Cl. 91—67.4)

This invention relates to improvements in dispensing containers.

The general object of this invention is to provide an improved dispensing container.

A further object of our invention is to provide a dispensing container wherein a hollow receptacle is provided and wherein a novel plunger operates in the receptacle.

An additional object of our invention is to provide a dispensing container having novel means therein for measuring the quantity dispensed.

Other objects and the advantages of this invention will be apparent from the following description taken in connection with the accompanying drawing wherein:

Fig. 1 is a section through our improved container.

Fig. 2 is a top plan view of the container.

Fig. 3 is a view similar to Fig. 1 of a modified form of container and

Fig. 4 is a top plan view of the device shown in Fig. 3.

Referring to the drawing by reference characters we have indicated our improved container generally at 10. As shown this container comprises a base 12 and a plunger 13. The base 12 and the plunger 13 may be made of any desired material but we preferably make them of moulded bakelite rubber, or glass as shown.

The base 12 is provided with a recess 14 which is open at the top and is provided with a threaded portion 15 which terminates short of the top of the base. In the surface of the recess 14 adjacent the top of the base we may provide, if desired, a groove 16 in which a resilient packing ring 17 is positioned. At the bottom of the recess 14 we provide a frusto-conical boss 18 which extends upwardly from the bottom of the recess and is moulded integral with the base.

The plunger 13 is provided on the outer surface thereof adjacent its lower end with a threaded portion 19 which is adapted to engage the threads 15 in the recess 14. Also on the outer surface of the plunger we provide indicating grooves 20. A conically shaped recess 21 is provided in the plunger which is open at the bottom and communicates with a reduced aperture 22 which opens through the top of the plunger. The wall of the recess 21 is inclined nearer to the vertical than the wall of the boss 18 so that the material will not be compacted therebetween but will, due to the different inclination, be allowed to move undisturbed. The wall of the recess is provided with a spiral groove 21' which as the plunger moves down causes the cream in the jar to more readily find its way to the aperture 12.

The container 10 is preferably adapted to dispense a viscous substance such as face cream for use in barber shops, beauty parlors, and homes, although it is not limited to such uses alone.

In use the plunger 13 is removed from the base 12 and the base recess 14 filled with the desired cream. The plunger recess 21 is also filled if desired and is then positioned in the recess 14 and moved downward until the threaded portion 19 thereof engages the threads 15 in the recess 14. As the plunger is moved downward some of the cream is forced into the plunger recess 21 and into the aperture 22. The operator discontinues the downward movement of the plunger when the cream begins to be expelled from the aperture 22.

When the operator wishes to expel a quantity of the cream from the container he rotates the plunger 13 so that it moves downwardly, whereupon the cream is forced out through the aperture 22 and the operator wipes his fingers across the top of the plunger over the aperture 22 thereby removing the cream. The graduations 20 may be spaced to indicate various amounts which will be expelled as they pass below the top of the base 12 and in this way the operator can expel predetermined amounts of the cream from the container.

The threaded portion 15 of the base recess 14 and the threaded portion 19 of the plunger may be entirely omitted if desired. When the threads are omitted it is only necessary for the operator to press the plunger downward to expel the contents of the container.

In Figs. 3 and 4 we have indicated generally at 25 a slight modification of our invention. The device 25 is similar to the device 10 and comprises a base 26 and a plunger 27. The base 25 is provided with a recess 28 which is open at the top and in the surface of the recess adjacent the top we provide a groove 29 in which a resilient packing member 30 is positioned. At the bottom of the recess 28 we provide a frusto-conical boss 31 which extends upwardly from the bottom of the recess and is made integral with the base.

The plunger 21 includes a recess 32 which is open at the bottom and at the top tapers into communication with a reduced aperture 33 which opens through the top of the plunger. In the top of the plunger surrounding the aperture 33 we provide a groove 34. Positioned in the recess 32 and the aperture 33 of the plunger we provide an absorbent member such as a sponge 35.

The device 25 is particularly adapted for moistening one's fingers when counting papers or for moistening gummed tape.

To prepare the device 25 for use the plunger 27 is removed and a quantity of water placed in the base recess 28 and then the plunger is replaced in the recess 28.

When an operator wishes to moisten his fingers he wipes them across the portion of the sponge 35 protruding from the aperture 33 or to moisten gummed tape the tape is wiped across the protruding portion of the sponge.

When the upper end of the sponge becomes dry the operator pushes the plunger 27 downward thereby forcing the sponge against the boss 31 which forces the water towards the protruding portion of the sponge. When the pressure or the plunger is released the sponge will absorb more of the water in the recess of the base.

By providing the groove 34 in the top of the plunger the water may be caused to flow into the groove where it is available for moistening purposes.

From the foregoing description it will be apparent that we have provided a novel dispensing container which is simple in construction, economical to manufacture, and is sanitary and efficient in use.

Having thus described our invention, we claim:

1. A container comprising a base member and a plunger member, said base having a recess therein open at the top, a groove in said recess adjacent the top of said base and a resilient packing member in said groove, a conically shaped boss in said recess extending upwardly from the bottom thereof, said plunger being positioned in said recess and said packing member engaging the outer surface of said plunger, there being a recess in said plunger open at the bottom and a reduced aperture in said plunger communicating with said plunger recess and opening through the top of said plunger, a groove in the top of said plunger surrounding said reduced aperture, an absorbent member in said plunger recess and reduced aperture, said absorbent member extending to the top surface of said plunger and being arranged to engage said conical boss in said base recess.

2. A container comprising a one-piece cast base member and a cast plunger member, said base having a cylindrical recess therein open at the top, said base having a thickened lower portion including an outwardly directed portion, said base having a conically shaped hollow boss extending upwardly therein, there being a cavity between the inner wall of said base member and the outer wall of said boss, said cavity terminating above said thickened lower portion, said plunger having an external surface substantially of the same diameter as said recess, and being positioned in said recess, there being a tapered recess in said plunger open at the bottom and extending through the top of said plunger.

STEVEN J. HARBAN.
DOCK A. HOLCOMB.